(12) United States Patent
Klijn

(10) Patent No.: US 9,100,580 B2
(45) Date of Patent: Aug. 4, 2015

(54) DIGITAL CAMERA SYSTEM AND METHOD

(75) Inventor: Jan Klijn, Breda (NL)

(73) Assignee: Robert Bosch GmbH, Stuttgart (DE)

( * ) Notice: Subject to any disclaimer, the term of this patent is extended or adjusted under 35 U.S.C. 154(b) by 604 days.

(21) Appl. No.: 13/391,399

(22) PCT Filed: Aug. 25, 2009

(86) PCT No.: PCT/EP2009/060899
§ 371 (c)(1),
(2), (4) Date: May 23, 2012

(87) PCT Pub. No.: WO2011/023219
PCT Pub. Date: Mar. 3, 2011

(65) Prior Publication Data
US 2012/0224097 A1    Sep. 6, 2012

(51) Int. Cl.
| | |
|---|---|
| *H04N 5/238* | (2006.01) |
| *H04N 5/335* | (2011.01) |
| *H04N 9/73* | (2006.01) |
| *H04N 5/235* | (2006.01) |

(52) U.S. Cl.
CPC ........... *H04N 5/2353* (2013.01); *H04N 5/2357* (2013.01)

(58) Field of Classification Search
CPC ... H04N 5/2353; H04N 5/2357; H04N 5/353; H04N 5/35536
USPC ........ 348/226.1, 227.1, 228.1, 362, 364, 367, 348/296, 297, 223.1, 225.1
See application file for complete search history.

(56) References Cited

U.S. PATENT DOCUMENTS

| | | | |
|---|---|---|---|
| 7,312,823 B1 | 12/2007 | Mori | |
| 2004/0201729 A1 | 10/2004 | Poplin | |
| 2008/0049132 A1* | 2/2008 | Suzuki | ........................ 348/308 |
| 2008/0143852 A1* | 6/2008 | Desprez-le-Goarant et al. | ........................ 348/226.1 |

FOREIGN PATENT DOCUMENTS

| | | |
|---|---|---|
| JP | 2001061105 | 3/2001 |
| JP | 2003032551 | 1/2003 |

OTHER PUBLICATIONS

PCT/EP2009/060899 International Search Report dated May 7, 2010 (3 pages).

* cited by examiner

*Primary Examiner* — Sinh Tran
*Assistant Examiner* — Mark Monk
(74) *Attorney, Agent, or Firm* — Michael Best & Friedrich LLP

(57) ABSTRACT

A digital camera system (1) is disclosed, comprising at least one pixel (3); a shutter means (4) for the pixel (3), whereby the shutter means (4) is adapted to generate at least one shutter pulse Stmax, Stmin during a frame period t for the pixel (3), whereby the pixel (3) is switched from a non-sensitive state to a sensitive state during the at least one shutter pulse t; and a memory means (5) for storing light information collected by the pixel (3) in the sensitive state during the frame period t; whereby the shutter means (4) is adapted to generate at least two shutter pulses for the pixel (3) during the frame period t.

20 Claims, 3 Drawing Sheets

DIGITAL CAMERA SYSTEM AND METHOD

BACKGROUND OF THE INVENTION

The invention relates to a digital camera system. More specifically, the invention relates to a digital camera system comprising at least one pixel, a shutter means for the pixel, whereby the shutter means is adapted to generate at least one shutter pulse during a frame period for the pixel, whereby the pixel is switched from a non-sensitive state to a sensitive state during the at least one shutter pulse, and a memory means for storing the light information collected by the pixel in the sensitive state during the frame period. The invention furthermore relates to a method using the digital camera system.

Digital cameras usually comprise a plurality of light-sensitive pixels which are arranged in a matrix. During taking an image with the digital camera the pixels are changed from a non-sensitive state to a sensitive state, for example by a mechanical or an electronic shutter system. In the sensitive state light impinging on the pixels is converted in electric current or in electric charge and is read out by a read out electronic.

SUMMARY OF THE INVENTION

A new digital camera system is disclosed which comprises at least one and—normally—a plurality of pixels, which are for example arranged in a matrix. The digital camera system may be embodied as a grey scale camera or as a colour camera. Also other embodiments like IR-, or UV-cameras are possible. Preferably, each pixel comprises a photodiode (for example a PIN) for collecting the light impinging on the pixel. In general, CMOS sensors or CCO sensors may be used in connection with the invention.

In the following, the invention is described by means of a single pixel, which is the at least one pixel. In a possible realisation of the invention each pixel of the plurality of pixels may have the same features and properties as the at least one pixel. It is also possible, that only a subset of the plurality of pixels is embodied as laid down below.

The digital camera system comprises a shutter means for the at least one pixel, which can—for example—be embodied as a mechanical and/or electronic shutter. Especially, the shutter means may be a global shutter for all pixels, a subset shutter for a subset of the plurality of pixels or a single shutter being only operable to be used with the at least one pixel.

Especially, the shutter may be realised as a so-called rolling shutter which is for example found on digital camera systems using CMOS sensors. This method of image acquisition records each individual image frame not as a single snapshot of a point in time but by scanning the frame line by line from top to bottom. The result is that not all pulses of the image are recorded as exactly the same time. In case of a global shutter, where all pixels are acquired at the same moment in time, the invention has also advantages as in case of fluorescent lighting or other non-continuous light sources, the frames of consecutive frames each frame may have another conditions of ambient light.

The shutter means is adapted to generate at least one shutter pulse during a frame period for the pixel. The frame period is the time period at which a single frame is captured from the digital camera system. The shutter pulse indicates a shutter time in which the pixel is sensitive, whereby outside of the shutter time the pixel is not light-sensitive. In other words, for the shutter pulse duration the pixel switches from a non-sensitive state to a sensitive state. The shutter means may also change the state of a read-out electronic in order to realise the switch in sensitivity.

The digital camera system furthermore comprises a memory means for storing the light information collected by the pixel in the sensitive state during the frame period. In some embodiments the memory means may—for example—store the charge of the pixel, in other embodiments the memory means may be based on an electric current.

According to the invention it is proposed that the shutter means is adapted to generate at least two shutter pulses for the pixel during a single frame period. In 10 further embodiments of the invention two, three, four etc. shutter pulses may be generated during a single frame period being dedicated or assigned to the at least one pixel.

It is one observation in connection with the invention that images taken with digital camera systems with an ambient light from non-continuous light sources often suffer in quality. Problems arise especially when the digital camera systems have a frame rate that has a similar frequency as the main frequency of the light source and/or as the mains frequency of the electric power supply. Another aspect is that in order to adapt the output of the digital camera system to the light level of the ambient light, shuttering is usually applied.

When the digital camera system is using shuttering and when the output of the light source is varying over the frame period and the frame rate of the digital camera system and the main or mains frequency are not the same and do not have a fixed relation, the amount of light and even the colour of light captured by the digital camera system may vary. For example, in case a fluorescent lighting is used as the light source, the colour of the light source varies starting at the ignition moment with a yellow colour of low brightness, turning into green after some milliseconds and ending as high brightness blue until the new period starts. The shutter pulse may be for example in a way that in a first frame the at least one pixel captures a yellow light, in a second frame a green light and in a third frame a blue light. The appearance of the three frames would differ significantly.

One possible solution would be to synchronise the frame rate to the main frequency of the light sources which is often the mains frequency. This approach is called mains lock or line lock. Another possible to overcome this problem is to use lenses with variable light opening (iris opening). However, wherein the iris opening also causes changes in view of sharpness due to the bending of light on one side and due to lens imperfections on the other side.

The invention proposes another approach, whereby during one single frame period at least two shutter pulses taking light information during two separated time periods are used. With this approach the frequency of the digital camera system is at least doubled, resulting in a decrease of negative effect in connection with non-continuous light sources.

In a preferred embodiment of the invention it is proposed to collect the light information during the at least two shutter pulses with an equal weight and/or to average the light information during the at least two shutter pulses in an equal manner. This embodiment underlines the idea just to take light information during at least two different points in time and—in a next step—to average them. Preferably, the weighting and/or averaging is realised in an analogue manner, especially prior to digitising the light information. In a preferred embodiment the light information of all shutter pulses are added and read-out as an added value.

It is furthermore preferred that the shutter means is adapted and/or operable to generate two shutter pulses having the same pulse length. The pulse length itself may be controlled according to the light level of the ambient light.

In a further preferred embodiment the at least two shutter pulses are arranged symmetrically to a centre time of the frame period, being in the middle of the frame period. In case of a equal number of shutter pulses the adjacent shutter pulses have the same temporal distance to the centre time, in case of an unequal number of shutter pulses one shutter pulse coincidence with the centre time.

Alternatively or additionally, the shutter pulses are distributed with equal time distances from each other within the frame period. The time distances may be measured from centre to centre of the shutter pulses.

In a possible development of the invention the digital camera system comprises a control module, which is adapted and/or operable to control shutter parameters, especially the number of shutter pulses of a frame period, the temporal distribution of the shutter pulses in the frame period and/or the pulse length of the shutter pulses.

It is furthermore optionally claimed that the control module is adapted to control the shutter parameters on the basis of characteristics of the ambient light. As already explained above, some combinations of the frame rate and frequency of the ambient light are negative for the quality of the frame, so that the shutter parameters are chosen to minimise these problems.

It is especially preferred that the control module is adapted to control the shutter parameters on the basis of the spectral and/or intensity variations over time of the ambient light during a single frame period.

In a further embodiment of the invention the digital camera system comprises an artificial light source for providing the ambient light. In this connection the frequency characteristics of the artificial light source and the shutter parameters are adapted to each other.

Furthermore it is preferred that the main frequency or the strongest frequency of the spectral and/or intensity variations of the artificial light source and/or the ambient light on the one hand side is smaller than the frequency of the shutter pulses on the other side. This condition reflects the condition of the Nyquist-theorem. It is more preferred, that said main or strongest frequency is equal or less than the half of the frequency of the shutter pulses, so that also the sampling theorem is satisfied.

In a preferred realisation of the invention the memory means comprises a 4T or 5T pixel structure and/or the digital system is realised as an on-chip system. Especially, the digital camera system is used as a security camera.

BRIEF DESCRIPTION OF THE DRAWINGS

The figures show.

DETAILED DESCRIPTION

Figure 1:
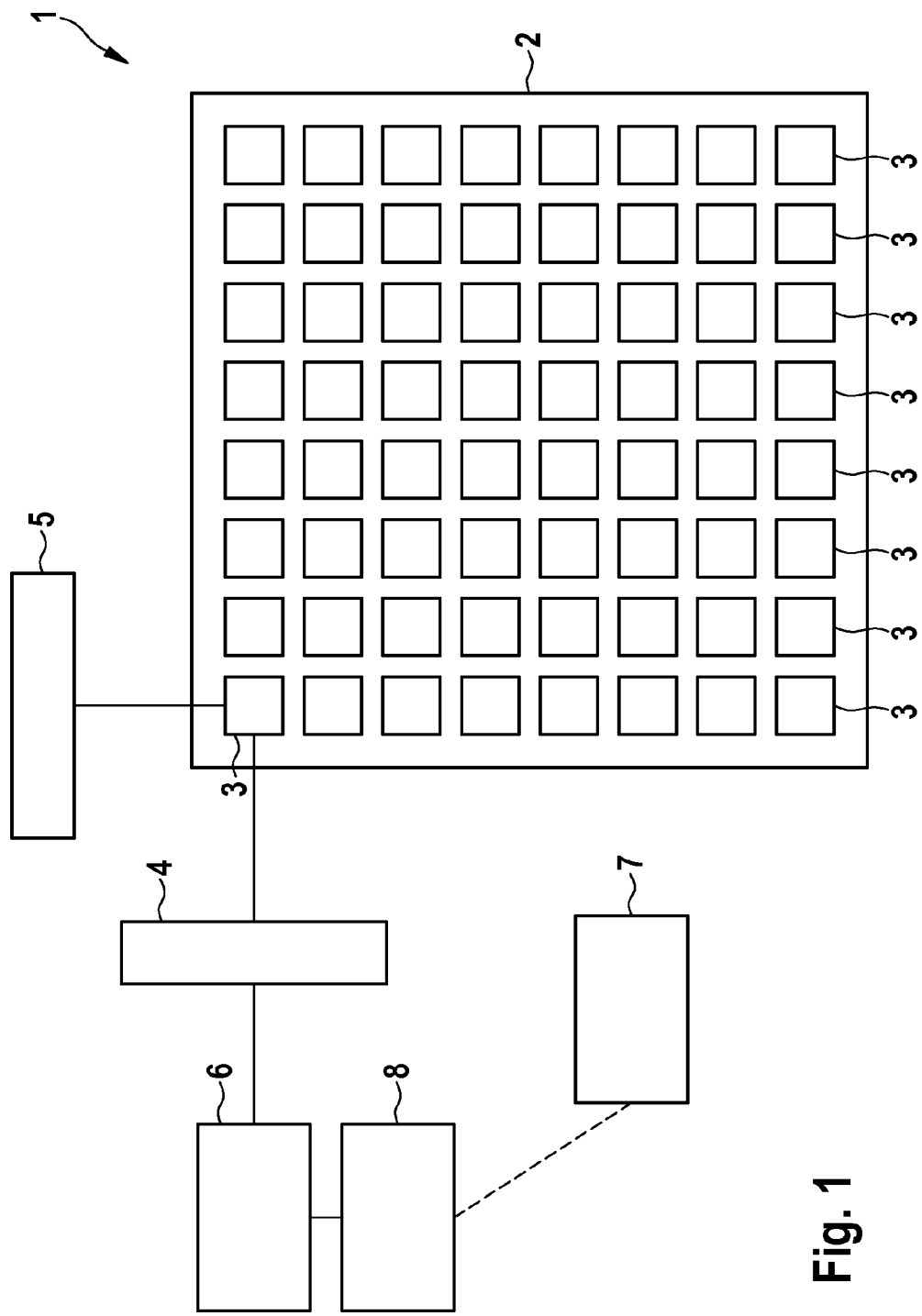
FIG. 1 a schematic block diagram of a digital camera system as an embodiment of the invention.

FIG. 1 shows a schematic block diagram of a digital camera system 1 embodied as an on-chip circuitry as a first embodiment of the invention. The digital camera system is for example used as a security camera for observing scenes or special places, like prisons, museums etc.

The digital camera system 1 comprises a pixel field 2 with a plurality of pixels 3 having for example a photodiode (PiN-diode) as a light sensing element. The digital camera system 1 may be realised as a colour or grey scale camera system and may be based on a CMOS or CCO technology.

At least one pixel 3, preferably some pixel 3 and especially every pixel 3 is controlled by a shutter 4, which is operable to switch the pixel 3 from a non-light-sensitive state to a light-sensitive state in which light impinging on the pixel 3 is converted into an electrical signal. The shutter 4 can be embodied as a mechanical shutter or as an electrical shutter. In case of an electrical shutter the shuttering mechanism is for example based on switching electrical components like capacitors or transistors.

The electrical signals generated from the pixel 3 are collected by a memory 5, which could be embodied as a capacitor. The memory 5 is especially operable to add a plurality of electrical signals during one single frame time. In case of a PiN diode as part of the pixel 3 and a capacitor as the memory 5 the capacitor allows that charge resulting from the light-sensitive element of the pixel 3 can be transferred to memory 5 and after some time a new charge can be added before the memory or the frame is read out. Such a structure is known and for example referred to as a 5T pixel structure. Other structures with a memory 5 are known as well (so-called 4T pixel or other). As the memory 5 just adds the electrical signals, the electrical signals are weighted in the same manner.

Furthermore, a control module 6 is provided, which is operable to control shutter parameters of shutter 5, especially the number of shutter pulses of a frame period, the temporal distribution of the shutter pulses in the frame period and/or the pulse length of the shutter pulses.

The digital camera system 1 may further comprise an artificial light source 7, which may be embodied as a fluorescent lighting or pulsed LED light source. The light source 7 is operable to illuminate the scene to be observed.

An analysing module 8 allows to analyse the characteristics of the ambient light generated by the light source 7, especially so that spectral and/or intensity variations during a single frame period may be retrieved. On the one hand side it is possible that the analyzing module 8 may comprise a sensor, which measures the said characteristics on the other hand side the analysing module 8 may comprise an input for receiving data of the light source 7. It is also possible that the analysing module is a man machine interface (MMI), which allows a manual input of the data.

Figure 2:
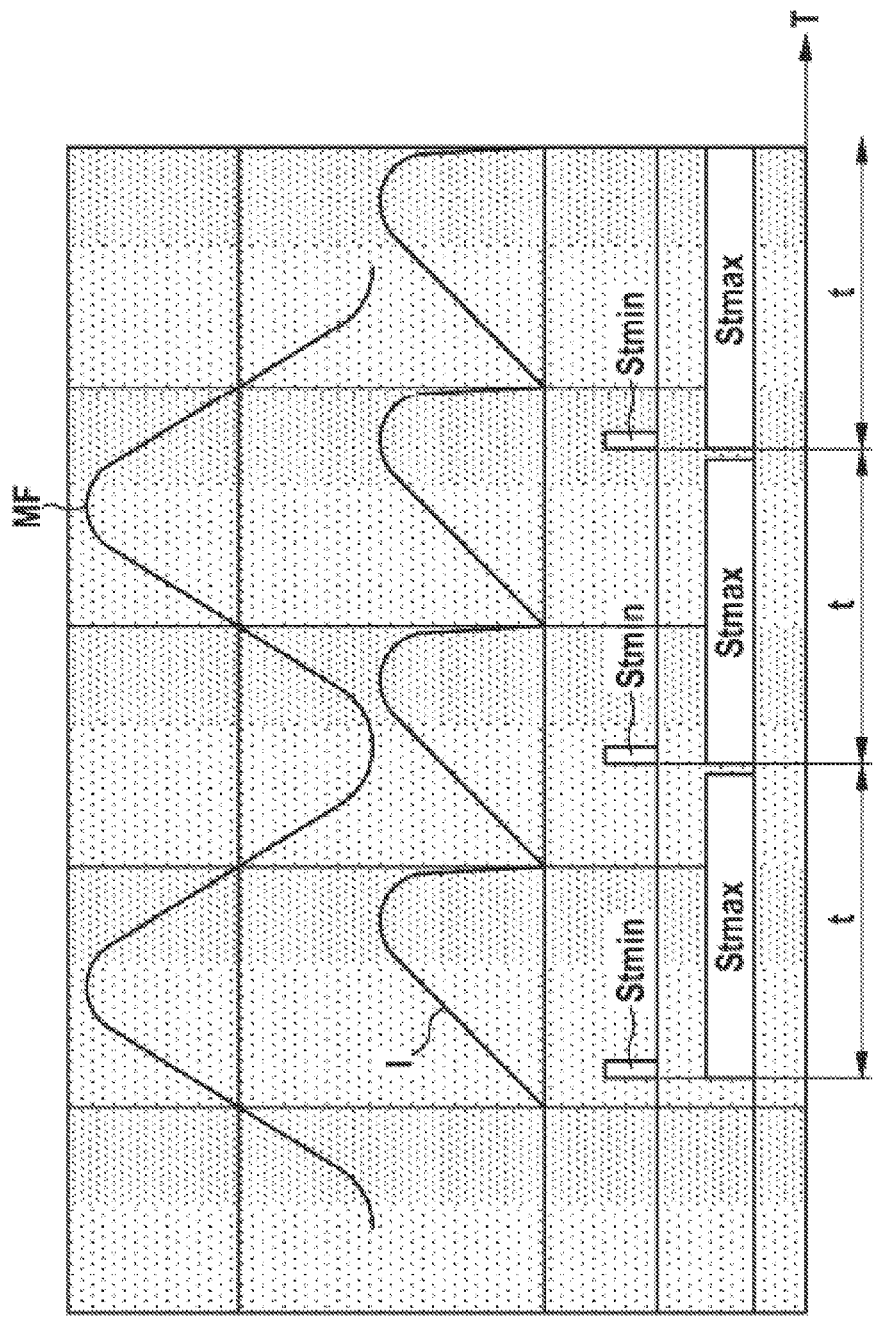
FIG. 2 a schematic illustration representing a shutter method as known by the state of the art.

FIG. 2 shows a schematic illustration of various signals, which are relevant during operation of the digital camera system 1 according to the state of the art.

In the bottom line the frame time t is displayed. The frame time t indicates the time period during which the pixel field 2 may be illuminated during one frame. The next line shows an example for a maximal shutter time Stmax and for the minimum shutter time Stmin in the next line. In FIG. 2 the frame period with a single shutter pulse per frame is shown, which is state of the art and not forming part of the invention.

The upper graph indicates the mains frequency MF over the time. As the consequence of the mains frequency MF intensity I of the light source 7 varies over a frame time t. The grey scale in the background illustrates the colour variations and thus the spectral characteristics of the light source 7 embodied as a fluorescent light with pulsed LEDs. The fluorescent light starts at the ignition moment with a yellowish colour of low brightness, changes into green after some milliseconds and ends as high brightness blue until the new half sine starts. The frequency of the frames with frame time t and of the mains frequency is similar to each other. As a consequence, the minimum shutter pulses Stmin vary in the position in the spectral and intensity level over different frames. As a further consequence the amount of light and even the colour of light captured by the digital camera system 1 vary.

The problem is further aggravating when so-called "rolling shutter" sensors are used because in these sensors the exposure duration is the same for all pixels but rolls down in time from top to bottom, and thus the amplitude and colour of the light taken by the different pixels 3 on the pixel field 2 change continuously in the vertical direction within one single frame.

Figure 3:
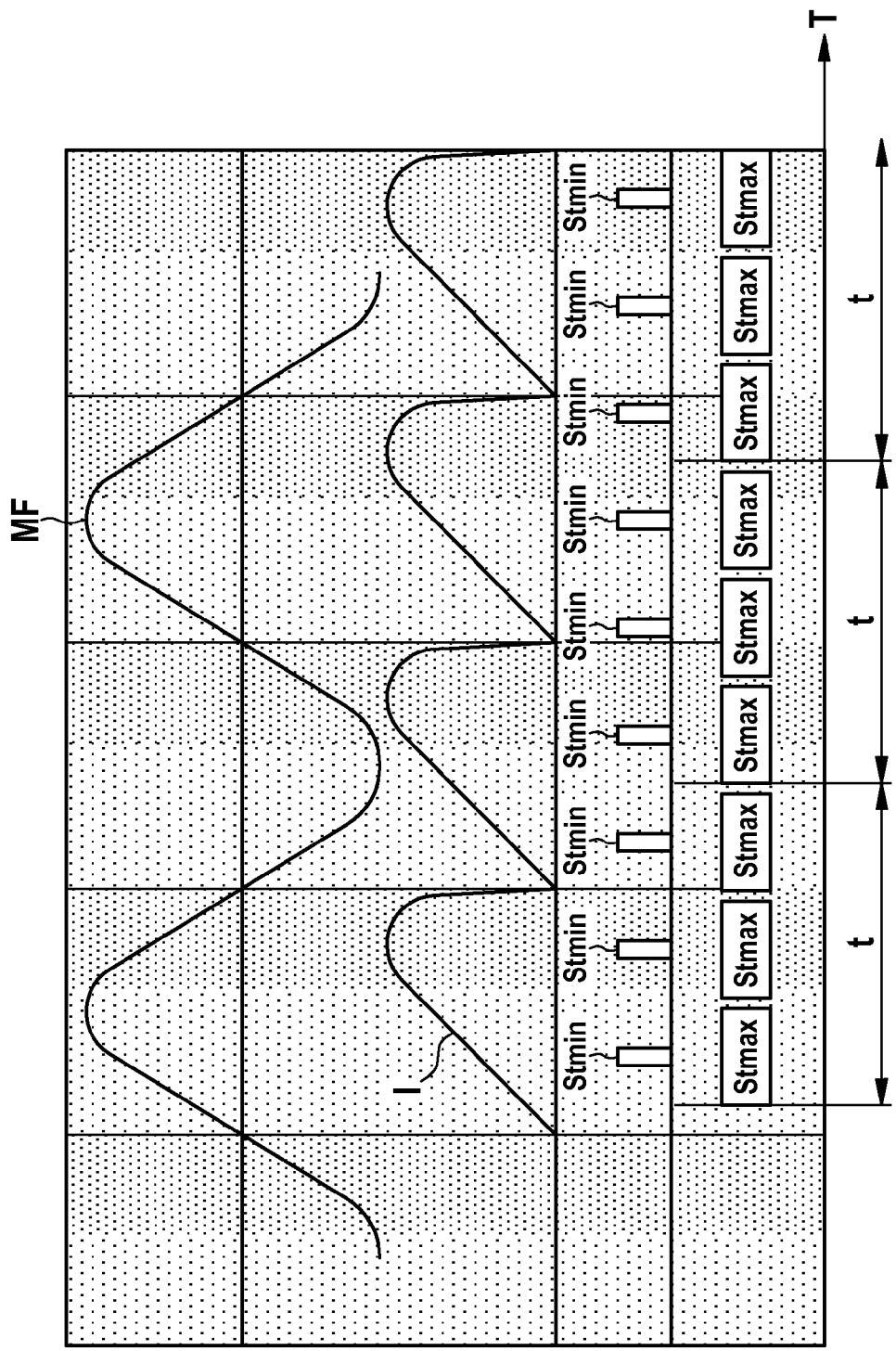
FIG. 3 a schematic illustration similar to FIG. 2, illustrating an embodiment of the method as an embodiment of the invention.

FIG. 3 shows a similar schematic illustration as FIG. 2, now illustrating an embodiment of the invention. As a difference to FIG. 2 multiple shutter pulses per frame are used whereby the number of the shutter pulses required depends on the speed or frequency of variation of the characteristics of the light source 7. The electrical signals generated during the multiple shutter pulses by the pixel 3 are collected in the memory 5 and thus are averaged and/or accumulated over the frame time t. As a result, constant intensity and colour is captured by the digital camera system 1.

The number of shutter pulses, length of shutter pulses and the distribution of the shutter pulses are controlled by control module 6 on basis of the characteristics of the ambient light analysed by analysing module 8. In the example is shown, the shutter pulses are distributed symmetrically to the centre time of a frame time t.

As in FIG. 2, examples with a maximum shutter pulse Stmax and a minimum shutter pulse Stmin are shown, whereby all three shutter pulses per frame time Stmin (or Stmax, respectively) have the same pulse length and the same temporal distance to each other.

The invention claimed is:

1. A digital camera system (1) comprising:
   at least one pixel (3);
   a shutter (4) for the pixel (3), whereby the shutter (4) is adapted to generate at least one shutter pulse (Stmax, Stmin) during a frame period (t) for the pixel (3), whereby the pixel (3) is switched from a non-sensitive state to a sensitive state during the at least one shutter pulse (t); and
   a memory (5) for storing light information collected by the pixel (3) in the sensitive state during the frame period (t);
   characterised in that the shutter (4) is adapted to generate at least two shutter pulses for the pixel (3) during the frame period (t);
   wherein the at least two shutter pulses are arranged symmetrically to a centre time of the frame period (t).

2. The digital camera system (1) according to claim 1, characterised in that the memory (5) is adapted to collect the light information during the at least two shutter pulses with an equal weight and to average the light information of the at least two shutter pulses in an equal manner.

3. The digital camera system (1) according to claim 1, characterised in that the at least two shutter pulses have the same pulse-length.

4. The digital camera system (1) according to claim 1, characterised in that the at least two shutter pulses are distributed with equal time distances within the frame period.

5. The digital camera system (1) according to claim 1, characterised by a control module (6) adapted to control shutter parameters, including the number of shutter pulses of a frame period, the temporal distribution of the shutter pulses in the frame period and the pulse length of the shutter pulses.

6. The digital camera system (1) according to claim 5, characterised in that control module (6) is adapted to control the shutter parameters on the basis of characteristics of ambient light.

7. The digital camera system (1) according to claim 6, characterised in that the characteristics of the ambient light comprise the spectral and/or the intensity variations during a single frame period.

8. The digital camera system (1) according to claim 6, characterised by an analysis module (8) for analyzing the ambient light, whereby the analysing result comprises data about the characteristics of the ambient light.

9. The digital camera system (1) according to claim 6, characterised by an artificial light source (7) for providing the ambient light.

10. The digital camera system (1) according to claim 5, characterised in that a main frequency of the spectral and intensity variations is smaller, than a frequency of the shutter pulses.

11. The digital camera system (1) according to claim 1, characterised in that the memory comprises a 4T or 5T pixel structure and the digital system is realised as an on-chip system.

12. The digital camera system (1) according to claim 1, wherein at least two shutter pulses are generated for the pixel (3) during the frame period (t) and the pixel (3) is sampled multiple times during the frame period.

13. The digital camera system (1) according to claim 1, characterised in that the memory (5) is adapted to collect the light information during the at least two shutter pulses with an equal weight.

14. The digital camera system (1) according to claim 1, characterised in that the memory (5) is adapted to collect the light information during the at least two shutter pulses to average the light information of the at least two shutter pulses in an equal manner.

15. The digital camera system (1) according to claim 1, characterised by a control module (6) adapted to control at least one of the number of shutter pulses of a frame period, the temporal distribution of the shutter pulses in the frame period, and the pulse length of the shutter pulses.

16. The digital camera system (1) according to claim 5, characterised in that the main frequency of the spectral variations is equal or less than the half of the frequency of the shutter pulses.

17. The digital camera system (1) according to claim 5, characterised in that the main frequency of the intensity variations is equal or less than the half of the frequency of the shutter pulses.

18. The digital camera system (1) according to claim 1, characterised in that the memory comprises a 4T or 5T pixel structure.

19. The digital camera system (1) according to claim 1, characterised in that the digital system is realised as an on-chip system.

20. The digital camera system (1) according to claim 1, wherein at least one of at least two shutter pulses are generated for the pixel (3) during the frame period (t) and the pixel (3) is sampled multiple times during the frame period.

* * * * *